(12) United States Patent
Seo et al.

(10) Patent No.: US 10,855,402 B2
(45) Date of Patent: Dec. 1, 2020

(54) METHOD FOR TRANSMITTING OR RECEIVING ACK/NACK SIGNAL IN WIRELESS COMMUNICATION SYSTEM AND APPARATUS FOR SAME

(71) Applicant: LG ELECTRONICS INC., Seoul (KR)

(72) Inventors: Inkwon Seo, Seoul (KR); Hanbyul Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 30 days.

(21) Appl. No.: 16/317,022

(22) PCT Filed: Jul. 7, 2017

(86) PCT No.: PCT/KR2017/007293
§ 371 (c)(1),
(2) Date: Jan. 10, 2019

(87) PCT Pub. No.: WO2018/012809
PCT Pub. Date: Jan. 18, 2018

(65) Prior Publication Data
US 2019/0245655 A1 Aug. 8, 2019

Related U.S. Application Data
(60) Provisional application No. 62/360,957, filed on Jul. 11, 2016.

(51) Int. Cl.
*H04L 1/16* (2006.01)
*H04L 1/08* (2006.01)
(Continued)

(52) U.S. Cl.
CPC .............. *H04L 1/1614* (2013.01); *H04L 1/00* (2013.01); *H04L 1/08* (2013.01); *H04L 1/16* (2013.01);
(Continued)

(58) Field of Classification Search
CPC ........................... H04L 1/1614; H04L 1/1612
See application file for complete search history.

(56) References Cited

U.S. PATENT DOCUMENTS

| 8,982,805 B2* | 3/2015 | Chen | ................ H04W 74/0833 |
| | | | 370/329 |
| 2007/0011504 A1* | 1/2007 | Kim | ..................... H04L 1/0001 |
| | | | 714/704 |

(Continued)

OTHER PUBLICATIONS

Deok-Seong Kim, Jae-wook Jung, H. Park and Young-Soo Kim, "A hybrid method for uplink ACK/NACK signaling," 2009 IEEE Radio and Wireless Symposium, San Diego, CA, 2009, pp. 699-702.*

(Continued)

*Primary Examiner* — Steve N Nguyen
(74) *Attorney, Agent, or Firm* — Lee Hong Degerman Kang Waimey (57) ABSTRACT

A method for a terminal receiving an ACK/NACK signal in a wireless communication system, according to one embodiment of the present invention, comprise the steps of: transmitting an uplink signal including a terminal identifier of the terminal through one of a plurality of resources belonging to a first resource pool, according to a contention-based multiple access scheme; and attempting detection of an ACK signal and/or a NACK signal relating to the uplink signal from a second resource pool linked to the first resource pool, wherein when the terminal attempts detection of the ACK signal or the NACK signal, the ACK signal is assumed to be terminal-specifically signaled based on the terminal identi- (Continued)

fier, and the NACK signal is assumed to be broadcasted through a bitmap specific to the first resource pool.

11 Claims, 7 Drawing Sheets

(51) Int. Cl.
    *H04W 72/04*     (2009.01)
    *H04L 5/00*     (2006.01)
    *H04L 1/18*     (2006.01)
    *H04L 1/00*     (2006.01)

(52) U.S. Cl.
    CPC .............. *H04L 1/1607* (2013.01); *H04L 1/18* (2013.01); *H04L 5/0055* (2013.01); *H04W 72/048* (2013.01); *H04W 72/0413* (2013.01)

(56) References Cited

U.S. PATENT DOCUMENTS

| | | | |
|---|---|---|---|
| 2007/0264936 A1* | 11/2007 | Kim | H04W 72/0453 |
| | | | 455/45 |
| 2008/0253326 A1* | 10/2008 | Damnjanovic | H04L 1/0006 |
| | | | 370/329 |
| 2010/0091725 A1* | 4/2010 | Ishii | H04W 72/04 |
| | | | 370/329 |
| 2010/0262886 A1* | 10/2010 | Ren | H04L 1/005 |
| | | | 714/751 |
| 2011/0243080 A1 | 10/2011 | Chen et al. | |
| 2012/0182977 A1 | 7/2012 | Hooli et al. | |
| 2012/0320760 A1 | 12/2012 | Kim et al. | |
| 2013/0022012 A1 | 1/2013 | Lee et al. | |
| 2013/0223364 A1* | 8/2013 | Akkarakaran | H04W 72/04 |
| | | | 370/329 |
| 2014/0254544 A1 | 9/2014 | Kar Kin Au et al. | |
| 2015/0009910 A1* | 1/2015 | Ryu | H04W 72/04 |
| | | | 370/329 |

OTHER PUBLICATIONS

PCT International Application No. PCT/KR2017/007293, Written Opinion of the International Searching Authority dated Oct. 17, 2017, 24 pages.

\* cited by examiner

METHOD FOR TRANSMITTING OR RECEIVING ACK/NACK SIGNAL IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2017/007293, filed on Jul. 7, 2017, which claims the benefit of U.S. Provisional Application No. 62/360,957, filed on Jul. 11, 2016, the contents of which are all hereby incorporated by reference herein in their entirety.

TECHNICAL FIELD

The present invention relates to a wireless communication system, and more particularly, to a method for transmitting or receiving an ACK/NACK signal on an uplink signal transmitted in a contention based multiple access scheme and an apparatus for the same.

BACKGROUND ART

As more communication devices require greater communication capacity, the need of mobile broadband communication more enhanced than the conventional RAT (radio access technology) has been issued in a next generation communication system discussed recently. Also, massive MTC (Machine Type Communications) technology that provides various services anywhere and at any time by connecting a plurality of devices and things is one of main issues which will be considered in next generation communication. Furthermore, considering service/UE susceptible to latency and reliability, URLLC (Ultra-Reliable and Low Latency Communication) has been discussed in a next generation communication system.

As described above, a new RAT considering eMBB, mMTC and URLCC has been discussed for next generation wireless communication.

DISCLOSURE

Technical Problem

An object of the present invention is to provide a method for efficiently and exactly transmitting or receiving an ACK/NACK signal on an uplink signal transmitted in a contention based multiple access scheme and an apparatus for the same.

The technical objects that can be achieved through the present invention are not limited to what has been particularly described hereinabove and other technical objects not described herein will be more clearly understood by persons skilled in the art from the following detailed description.

Technical Solution

To achieve the object of the present invention, a method for receiving an ACK/NACK signal by a user equipment (UE) in a wireless communication system comprises transmitting an uplink signal including a UE identifier of the UE through one of a plurality of resources belonging to a first resource pool, in accordance with a contention-based multiple access scheme; and attempting to detect at least one of an ACK signal or a NACK signal for the uplink signal from a second resource pool associated with the first resource pool, wherein in attempting to detect the ACK signal or the NACK signal, the UE assumes that the ACK signal is UE-specifically signaled based on the UE identifier, and the NACK signal is broadcasted through a bitmap that is specific to the first resource pool.

The bitmap may include a plurality of bits each corresponding to each of the plurality of resources belonging to the first resource pool. The UE may determine a failure cause in transmission of the uplink signal in accordance with a bit value corresponding to a resource used for transmission of the uplink signal among the plurality of bits.

For example, if the bit value is a first value, the UE may regard that initial transmission of the uplink signal has been failed due to a lack of a transmission power, and may retransmit the uplink signal by boosting the transmission power. If the bit value is a second value, the UE may regard that initial transmission of the uplink signal has been failed due to interference from another UE, and may retransmit the uplink signal at a coding rate lower than that of initial transmission or retransmits the uplink signal through a third resource pool having a unit resource greater than that of the first resource pool.

The UE may disregard the NACK signal even though the NACK signal is detected if the ACK signal is detected, and may perform UL retransmission if the ACK signal is not detected and the NACK signal is detected.

The UE may receive information on each of the first resource pool for initial transmission of the uplink signal and the third resource pool for retransmission of the uplink signal from a base station.

In accordance with another aspect of the present invention, a UE for performing a method for receiving an ACK/NACK signal may be provided.

To achieve the object of the present invention, a method for transmitting an ACK/NACK signal from a base station in a wireless communication system according to still another aspect of the present invention comprises attempting to detect an uplink signal including a UE identifier transmitted in accordance with a contention-based multiple access scheme through one of a plurality of resources belonging to a first resource pool; and transmitting at least on of an ACK signal or a NACK signal for the uplink signal on a second resource pool associated with the first resource pool, wherein in transmitting the ACK signal or the NACK signal, the base station UE-specifically signals the ACK signal based on the UE identifier, and broadcasts the NACK signal through a bitmap that is specific to the first resource pool.

The bitmap may include a plurality of bits each corresponding to each of the plurality of resources belonging to the first resource pool, and the base station may set a bit value corresponding to a resource used for transmission of the uplink signal among the plurality of bits in accordance with a failure cause in detection of the uplink signal.

If it is determined that detection of the uplink signal has been failed due to a lack of a transmission power, the base station may set the bit value to a first value, and if it is determined that detection of the uplink signal has been failed due to interference from another UE, the base station may set the bit value to a second value.

The base station may receive the uplink signal retransmitted from the UE after the NACK signal is transmitted. The retransmitted uplink signal may have a coding rate lower than that of initial transmission, or may be received through a third resource pool having a unit resource greater than that of the first resource pool.

The base station may receive information on each of the first resource pool for initial transmission of the uplink signal and the third resource pool for retransmission of the uplink signal from a base station.

In accordance with further still another aspect of the present invention, a base station for performing the aforementioned method for transmitting an ACK/NACK signal may be provided.

Advantageous Effects

According to one embodiment of the present invention, ACK signal on an uplink signal transmitted in a contention based scheme may be transmitted through UE-specific signaling, whereby complexity of ACK detection may be reduced, and NACK signal may be broadcasted and its bit value may be used to indicate a failure cause of transmission, whereby ACK/NACK signaling and retransmission may be performed more exactly and efficiently.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

MODE FOR INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present invention may be non-limited. Specific terminologies used in the following description are provided to help understand the present invention and the use of the terminologies can be modified to a different form within a scope of the technical idea of the present invention.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
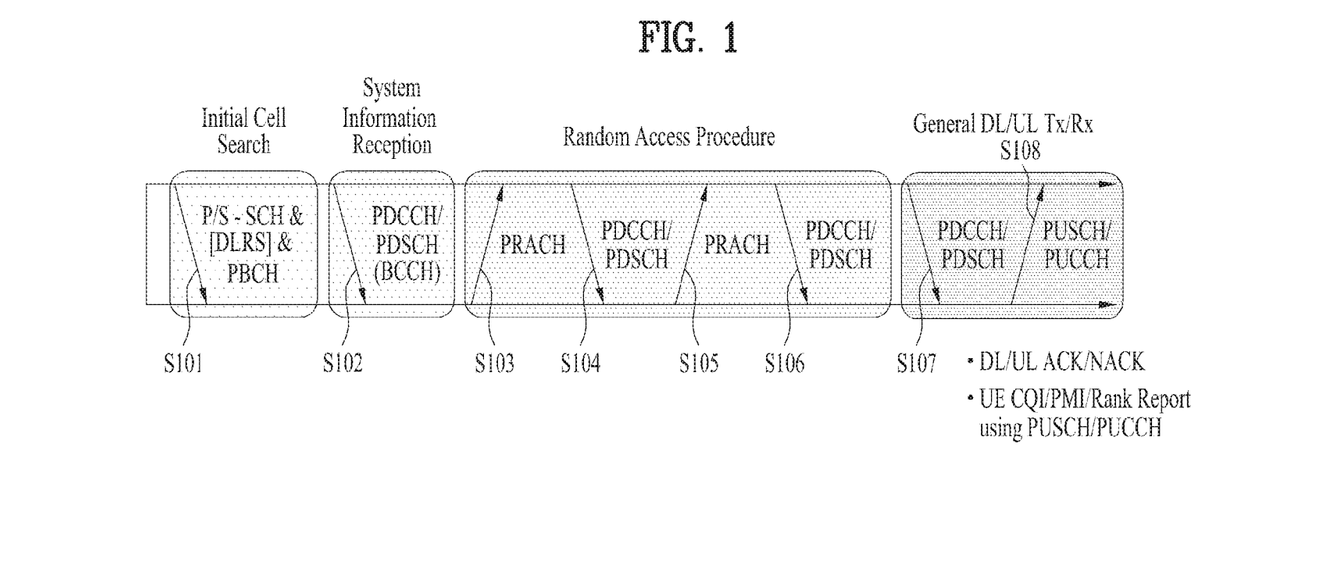
FIG. 1 is a diagram for explaining an example of physical channels used for 3GPP LTE/LTE-A system and a general signal transmission method using the same.

FIG. 1 is a diagram for explaining an example of physical channels used for 3GPP LTE/LTE-A system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the eNB, may match synchronization with the eNB and may then obtain information such as a cell ID and the like. Subsequently, the user equipment may receive a physical broadcast channel (PBCH) from the eNB and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the eNB [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to an eNB by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
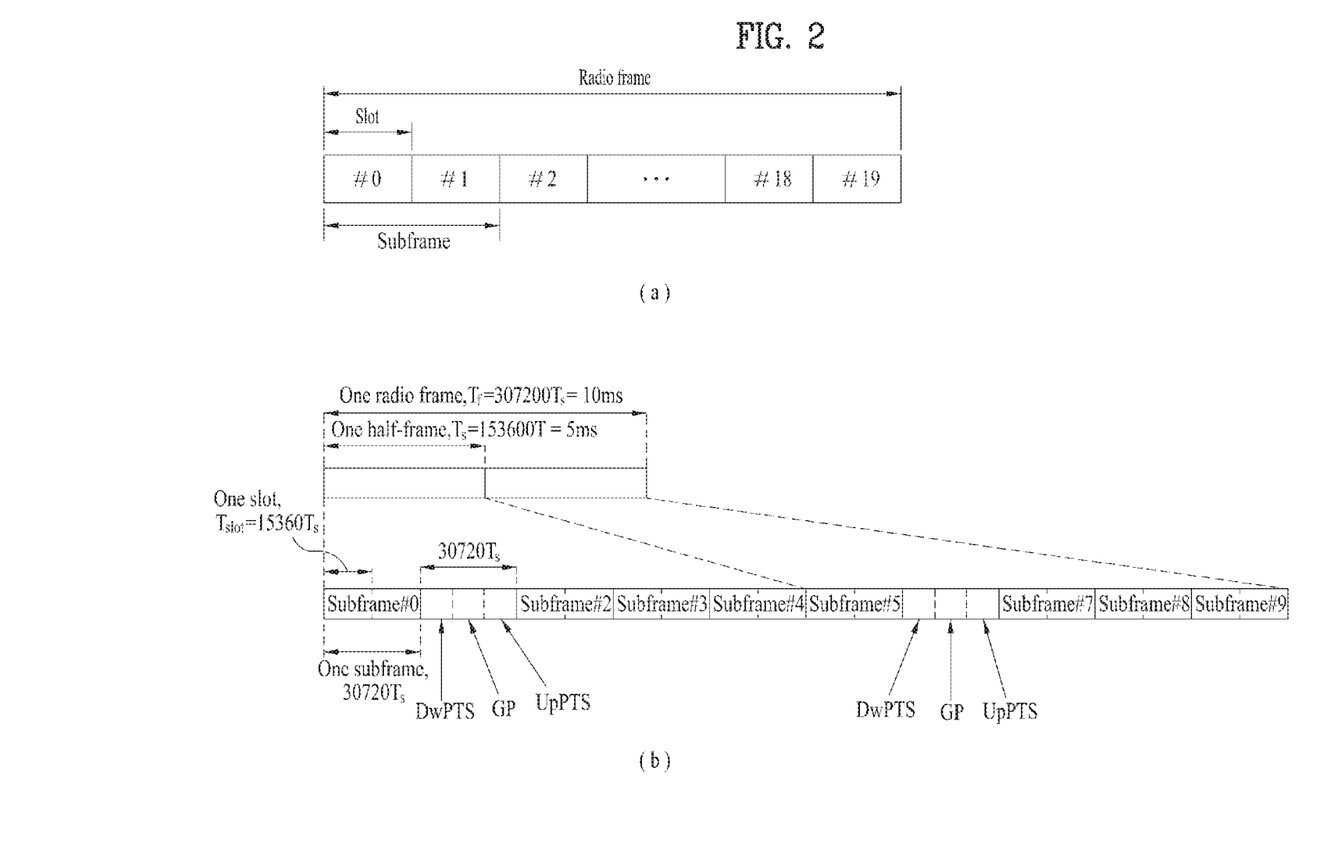
FIG. 2 is a diagram for explaining an example of a structure of a radio frame for 3GPP LTE/LTE-A system.

FIG. 2 is a diagram for explaining an example of a structure of a radio frame. Referring to FIG. 2, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2 (b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a user equipment. The UpPTS is used for channel estimation in an eNB and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
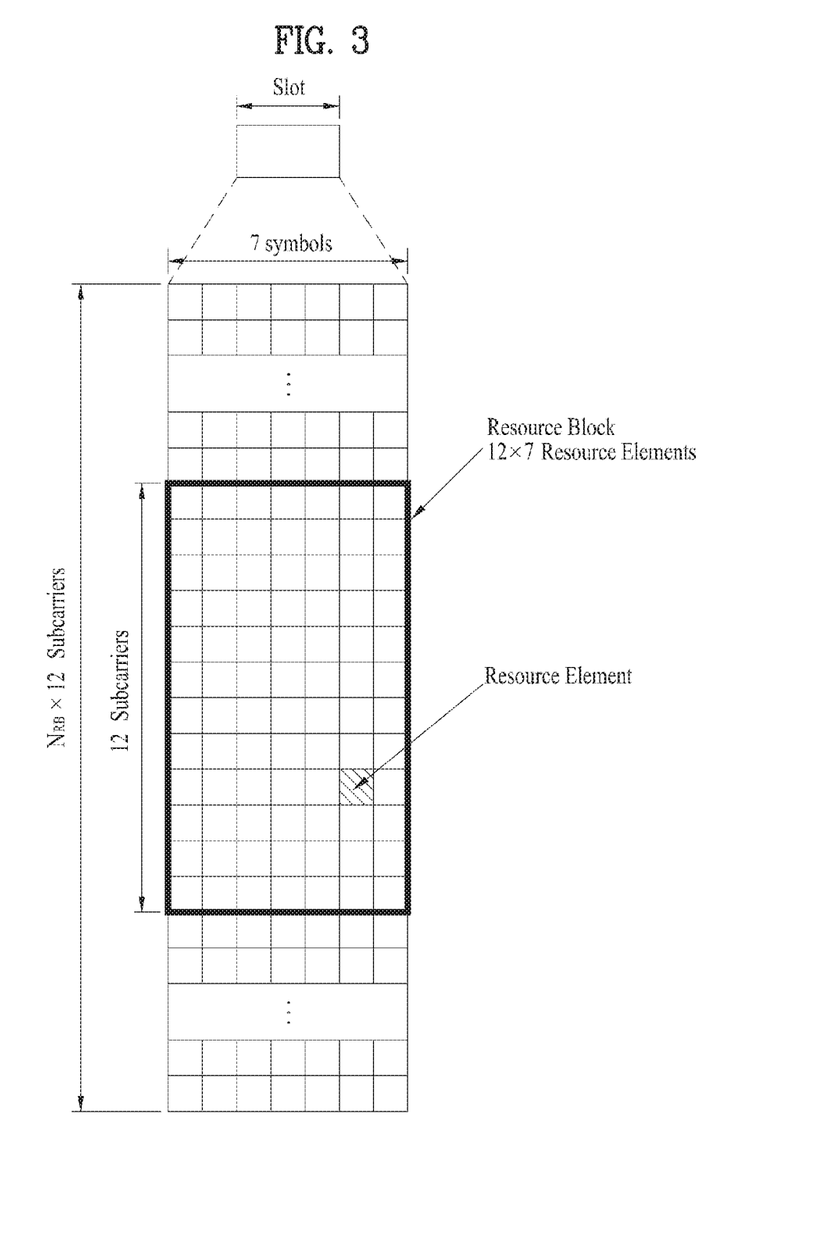
FIG. 3 is a diagram for one example of a resource grid for a downlink slot for 3GPP LTE/LTE-A system.

FIG. 3 is a diagram for one example of a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number $N_{RB}$ of resource blocks included in a DL slot may depend on a DL transmission bandwidth. And, the structure of an uplink (UL) slot may be identical to that of the DL slot and OFDM symbol is replaced by SC-FDMA symbol.

Figure 4:
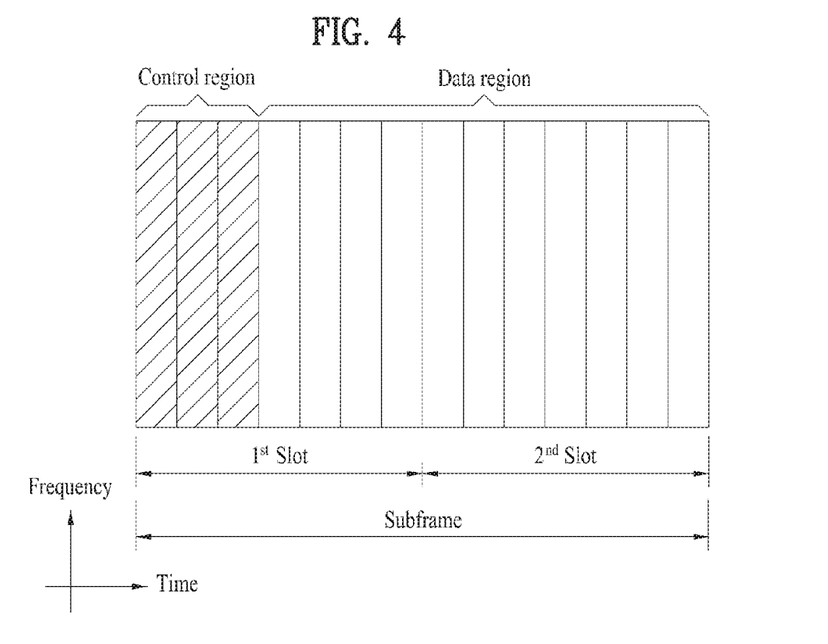
FIG. 4 is a diagram for a structure of a downlink subframe for 3GPP LTE/LTE-A system.

FIG. 4 is a diagram for an example of a structure of a downlink subframe.

Referring to FIG. 4, maximum 3 (4) OFDM symbols situated at a fore part of a first slot of one subframe correspond to a control region to which control channels are allocated. The rest of OFDM symbols correspond to a data region to which PDSCH (physical downlink shared channel) is allocated. PDSCH is used for carrying a transport block (hereinafter abbreviated TB) or a codeword (hereinafter abbreviated CW) corresponding to the TB. The TB means a data block delivered from a MAC (medium access control) layer to a PHY (physical) layer on a transport channel. The CW corresponds to a coded version of the TB. Correlation between the TB and the CW may vary depending on a swapping. In the present specification, PDSCH, a TB, and a CW are used in a manner of being mixed. Examples of DL control channels used by LTE (-A) may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries a HARQ-ACK (hybrid automatic repeat and request acknowledgement) signal in response to an UL transmission. The HARQ-ACK response includes a positive ACK (simply, ACK), a negative ACK (NACK), DTX (discontinuous transmission), or NACK/DTX. In this case, HARQ-ACK, HARQ ACK/NACK, and ACK/NACK are used in a manner of being mixed.

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Figure 5:
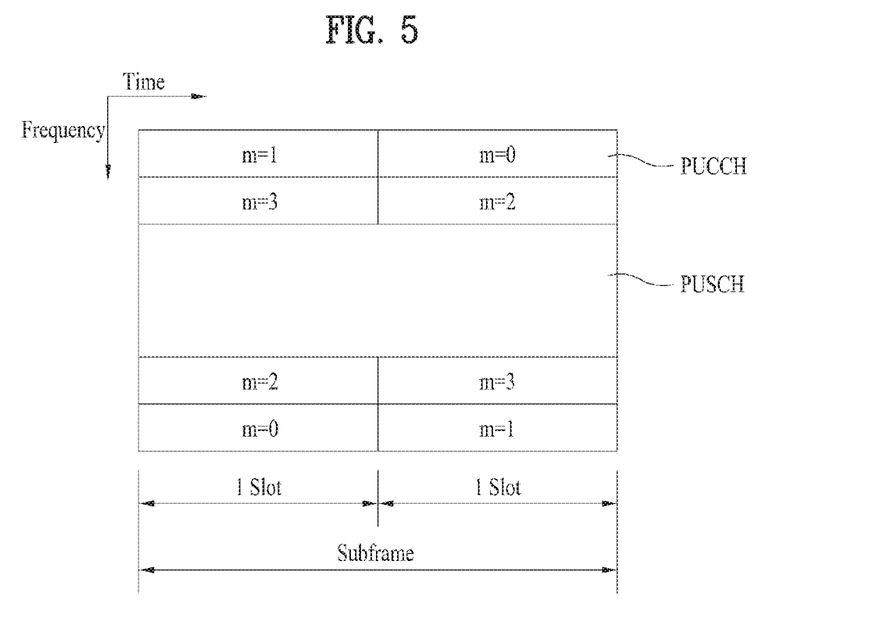
FIG. 5 is a diagram for a structure of an uplink subframe for 3GPP LTE/LTE-A system.

FIG. 5 is a diagram for an example of a structure of an uplink subframe.

Referring to FIG. 5, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). The PUCCH includes a RB pair situated at the both ends of the data region on a frequency axis and hops on a slot boundary.

The PUCCH can be used for transmitting control information such as SR(Scheduling Request), HARQ-ACK and/or CSI (Channel State Information)s.

New RAT

According to performance requirements for the new RAT, a subframe needs to be newly designed to satisfy low latency. The 3GPP LTE system has been designed in a frame structure having TTI of 1 ms, and a data request latency time for a video application is 10 ms. However, future 5G technology requires data transmission of lower latency due to the introduction of a new application such as real-time control and tactile internet, and aims to provide data latency reduced by 10 times as compared with the related art.

Self-Contained Subframe

Figure 6:
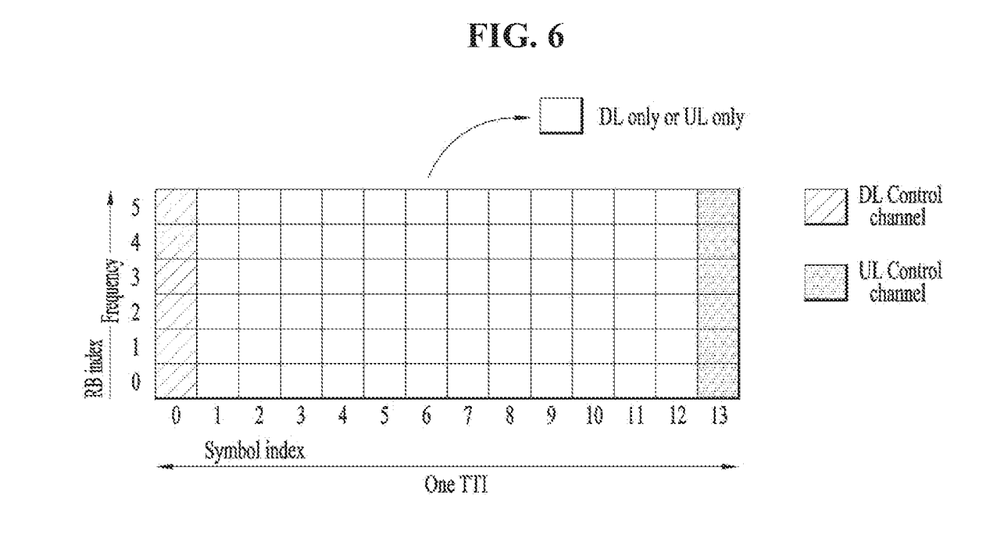
FIG. 6 is a diagram illustrating a structure of a self-contained subframe according to one embodiment of the present invention.

FIG. 6 is a diagram illustrating a structure of a self-contained subframe according to one embodiment of the present invention.

According to a TDD-based self-contained subframe structure, both a resource region for DL and a resource region for UL (e.g., DL and UL control channels) exist in one subframe.

In FIG. 6, oblique line areas indicate downlink control regions and black colored areas indicate uplink control regions. Areas having no mark may be used for downlink data transmission or uplink data transmission.

In this self-contained subframe restructure, downlink (DL) transmission and uplink (UL) transmission are performed in due order within one subframe, whereby DL data may be transmitted and UL ACK/NACK may be received within one subframe. Similarly, UL data may be transmitted and DL ACK/NACK may be received within one subframe. As a result, the time required for data re-transmission may be reduced when an error occurs in data transmission, whereby latency of final data transfer may be minimized.

As described above, the expression "Self-Contained" may cover that a response (ACK/NACK) to DL or UL transmitted within the corresponding subframe is received within the corresponding subframe. However, since the time of one subframe or more may be required for transmission and response in accordance with processing performance of the UE/eNB, the self-contained subframe will be defined as a subframe that may self-contain DL control information, DL/UL data and UL control information. That is, UL control information of Self-contained Subframe is not limited to HARQ-ACK information on DL data transmitted at the corresponding subframe.

This self-contained subframe structure requires a time gap that allows an eNB and a UE to switch a transmission mode to a reception mode and vice versa. To this end, at least one OFDM symbol on which DL to UL switching is performed is set as a guard period (GP) in the self-contained subframe structure.

Although the self-contained subframe structure shown in FIG. 6 shows that a subframe is configured in the order of DL control region-data region-UL control region, the present invention is not limited thereto. For example, as another self-contained subframe structure, a subframe may be configured in the order of DL control region-UL control region-data region.

Also, for convenience of description, one subframe includes a total of 14 OFDM symbols, and one OFDM symbol is allocated to each of the DL control region and the UL control region. However, one or more OFDM symbols may be allocated to each of the DL control region and the UL control region. Similarly, the number of OFDM symbols included in one subframe may be changed.

Figure 7:
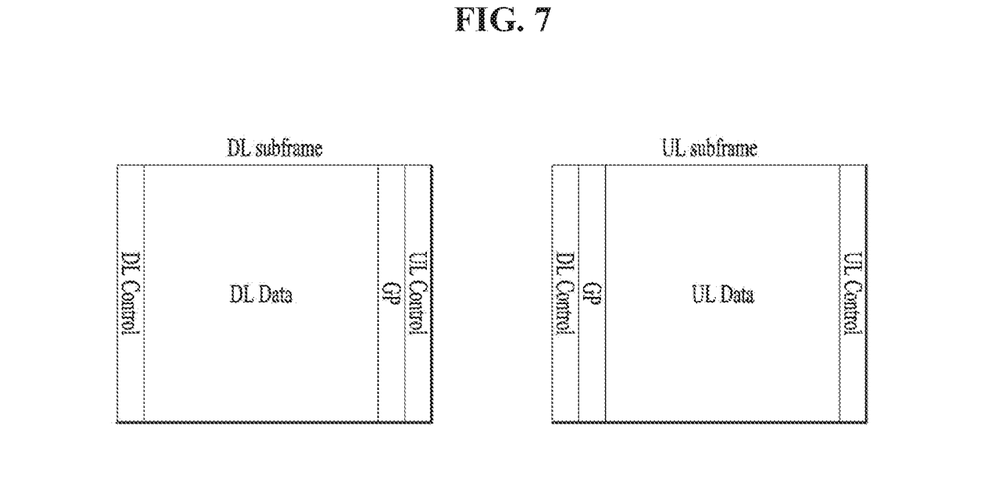
FIG. 7 is a diagram illustrating a downlink self-contained subframe and an uplink self-contained subframe according to one embodiment of the present invention.

FIG. 7 is a diagram illustrating a DL subframe and a UL subframe according to one embodiment of the present invention.

Referring to FIG. 7, the GP is located at the time when DL is switched to UL. For example, the GP is located between the DL data region and the UL control region at the DL subframe, and is located between the DL control region and the UL data region at the UL subframe.

The GP may include Tx/Rx switching time of the eNB/UE and a timing advance (TA) for UL transmission of the UE.

Analog Beamforming

Since a wavelength becomes short in the field of Millimeter Wave (mmW), a plurality of antenna elements may be installed in the same area. That is, a wavelength is 1 cm in a band of 30 GHz, and a total of 100 antenna elements of a 2D array may be arranged in a panel of 5 by 5 cm at an interval of 0.5λ (wavelength). Therefore, as a plurality of antenna elements are used, beamforming gain is enhanced, and coverage increase and/or throughput improvement is expected.

In the mmW scheme, if a transceiver unit (TXRU) is provided per antenna element, it is possible to control a transmission power and phase per antenna element, whereby independent beamforming may be performed for each frequency resource. However, a problem occurs in that effectiveness is deteriorated in view of cost when TXRU is independently provided for all of 100 antenna elements.

Therefore, a scheme for mapping a plurality of antenna elements into one TXRU and controlling a beam direction by an analog phase shifter may be considered. However, since this analog beamforming scheme forms beams in only one beam direction with respect to a full band, a problem occurs in that frequency selective beamforming is not available.

As a hybrid type of digital beamforming and analog beamforming, a hybrid beamforming scheme for mapping a total of B TXRUs into a total of Q antenna elements (where, B<Q) may be considered. In this case, although there is a difference depending on a mutual connection scheme of B TXRUs and Q antenna elements, the number of beam directions that enable simultaneous transmission is limited to B or less.

ACK/NACK Signaling for Contention Based Transmission

Hereinafter, ACK/NACK signaling method for contention based transmission will be described.

In New RAT (NR), contention based UL transmission may be considered for latency reduction, signaling overhead reduction, power saving, etc. In this case, the contention based UL transmission may mean that a UE performs UL transmission using a random resource within a given resource region without exact allocation of UL resource and timing. The contention based UL transmission may also mean that the UE performs UL transmission without UL grant (i.e., control signaling for UL transmission) defined in the LTE system.

In this specification, the contention based UL transmission may be applied to only a part of various UL transmitting signals (e.g., SR, BSR, PUSCH, PUCCH, and SRS) defined in UL of the legacy LTE. For example, contention based transmission may be applied to only a scheduling request (SR) and a buffer status report (BSR), or may be applied to only initial transmission of PUSCH. Contention based transmission may not be applied to transmission of a channel in which contention based transmission is not defined or retransmission of PUSCH.

This contention based transmission may reduce overhead and latency for transmitting or receiving control signaling, and may have a power saving effect by reducing blind detection of a UE for control signaling if there is no UL transmission. On the other hand, since there is no dedicated resource allocation per UE for UL transmission in contention based transmission, a problem occurs in that it is difficult for a network to specify a UE which has performed UL transmission in a specific resource.

In this specification, methods for increasing reliability for UL transmission by solving the problem are suggested. The suggested methods may be implemented independently or in combination, and if contention based transmission is introduced even in a system other than NR, these methods may be applied to the system. Also, for convenience of description, although the invention description has been given in view of time/frequency resources, the embodiments of the present invention are not limited to time/frequency domains, and may be applied to multiple access methods based on code domain resources such as scrambling and spreading.

<Resource Pool Allocation for Contention Based Transmission>

For contention based UL transmission, the network may classify UL resources and signal corresponding information to the UE. Resource information for UL transmission may be broadcasted (e.g., MIB, SIB, group specific RRC signaling), or may be delivered through UE-dedicated signaling (e.g., RRC signaling and RRC connection related message). Also, in the present invention, different resources according to multiple access systems such as spreading code, scrambling code, interleaving pattern and power allocation may belong to resource categories of the present invention without limitation to time/frequency resources. Resource pool allocation methods suggested as follows may configure a resource pool independently or in combination. Resource pool identification by the following methods may be performed even within the same subframe. For example, a specific resource region within the same subframe may be designated as resource pool 1, and another resource region may be designated as resource pool 2. At least a part of the resource pool 1 and at least a part of the resource pool 2 may be overlapped with each other. In the following suggested methods, each resource pool may be defined in time/frequency domains.

(1) Resource Pool Configuration Per Repetition/Retransmission

The network may define a plurality of resource pools by dividing UL resources in accordance with repetition/retransmission, and may indicate these resource pools to the UE. For example, the network may designate different resource pools in accordance with repetition/retransmission times.

For example, the network may divide subframes into a subframe set, which may be used in case of new transmission, a first subframe set(s) (or second, third, etc.) which may be used for repetition/retransmission, etc. by grouping UL subframes. A method for configuring a resource pool in a unit of subframe may be applied to even an embodiment in which a resource pool is configured per resource unit size suggested as follows.

For another example, the network may divide each subframe into a plurality of regions and allocate the order of repetition/retransmission that may be performed for each region.

The network may enhance the probability of successful transmission or the probability of successful decoding by differently allocating a resource size of each resource pool. For example, a size of a resource pool used for retransmission may be set to be greater than that of a resource pool used for new transmission, whereby the probability of collision in retransmission may be lowered.

(2) Resource Pool Configuration Per Resource Unit Size

This method may be construed that the UE may be allocated a plurality of resource pools and configured MCS level or resource size, which may be used for each resource pool. This may be construed, in view of a coding rate, that a respective coding rate is used for each resource pool. That is, this may mean that the same information bits are transmitted by being encoded at a coding rate corresponding to 1/3 in a specific pool, whereas the same information bits are transmitted by being encoded at a coding rate corresponding to 1/4 in another pool.

In contention based transmission, if sizes of data transmitted by UEs are different from each other, since the network should attempt blind detection by assuming each of a plurality of data sizes for UL resources, complexity of blind detection may be increased. Therefore, in contention based UL transmission, it may be preferable that the UE limits a size of a resource used for UL transmission to a predetermined number of predefined candidates. In this case, the size of the resource is not limited to a size of a resource used for actual transmission, and may cover a size of an information bit length. For example, the size of the resource used for actual transmission may be varied depending on a channel coding and modulation scheme. According to one embodiment of the present invention, instead of a size of a resource that can be used, a size of information bits that can be used may be defined. At this time, the size of the resource that can be used may be defined previously for each pool, or one or more size values may be defined previously.

As described above, such limitation in size of information bits may be applied to even an embodiment in which a resource pool for each of repetition/retransmission suggested as above is configured individually. For example, if QPSK is used, information bits of 20 bits are transmitted (i.e., 1/3 coding rate) by being mapped into 30 REs in a first pool where initial transmission is performed, and are transmitted (i.e., 1/4 coding rate) by being mapped into 40 REs in a second pool where retransmission is performed.

As described above, the size of the limited resource or a size of a resource according to the size of the limited information bits may be referred to as a unit resource.

The UE may perform transmission by using all resources within a unit resource, or may perform transmission by using only some of resources within the unit resource due to the introduction of a sparse code. Alternatively, the unit resource may be defined based on resources which are actually used. For example, a certain ratio to a total of resources which are actually used may be defined as the unit resource. Alternatively, if the size of resources which are actually used belongs to a first range, the unit resource may be defined as a first size, and if the size of resources which are actually used belongs to an Nth range, the unit resource may be defined as an N size.

In one embodiment of the present invention, a plurality of sizes may be defined for the unit resource which is used. This may be useful for increase of resource efficiency and reduction of complexity in contention based UL transmission. At this time, a different resource pool may be mapped into each unit resource size. This may be construed that resource pools are identified by application of different coding rates to information bits of a specific length. For example, if information bits of a specific length are coded at a first coding rate, it may correspond to a first unit resource size, and if information bits of a specific length are coded at a second coding rate, it may correspond to a second unit resource size. The first unit resource size may be used in a first resource pool, and the second unit resource size may be used in a second resource pool.

Also, if the unit resource size is differently configured per resource pool, it may mean that a type of data transmitted by UL transmission is different per resource pool. A first unit resource size may be applied to data of a first type, and a second unit resource size may be applied to data of a second type. A resource pool, which can be transmitted, may be determined depending on a type of UL transmission performed by the UE, and information on each resource pool may be defined previously, or may be indicated through higher layer signaling.

For example, a resource pool which uses 2 PRP pairs to perform UL transmission of unit information bits of 40 bits may be designated as a first resource pool, and a resource pool which uses 4 PRP pairs to perform UL transmission of unit information bits of 40 bits may be designated as a second resource pool.

(3) ACK/NACK Resource Pool

A method for configuring a plurality of resource pools in UL resource for contention based transmission has been suggested as above. Meanwhile, a DL resource pool for ACK/NACK signaling for UL transmission may be defined. If a resource pool for DL transmission is defined as above, since the UE has only to perform blind detection for a given resource pool only, complexity caused by blind detection may be reduced. Also, since the network may designate a plurality of resources for ACK/NACK signaling, the UE attempts ACK/NACK detection in a plurality of resources even in the case that the network changes UL/DL subframe configuration by the need, whereby more flexible resource allocation may be performed. For example, if only one DL resource is configured for ACK/NACK and UL/DL subframe configuration is changed, DL resource for ACK/NACK should be reconfigured. For example, DL resource configured for ACK/NACK may be changed to UL resource in accordance with UL/DL subframe configuration change, and the network should reselect resources for ACK/NACK within DL subframe. However, if a resource pool instead of a single resource is configured for ACK/NACK signaling, the existing resource pool configuration may be reused in spite of DL/UL subframe configuration change.

The network may define and signal ACK/NACK resource pool corresponding to each UL resource pool defined as suggested above or in other way.

For example, the network may define DL ACK/NACK resource pool "Y" corresponding to contention based UL resource pool "X". In this case, Y may be defined as a specific resource region within each subframe including a subframe set. The UE to which the resource pool "Y" has been signaled may perform blind detection for detecting ACK/NACK for contention based UL transmission, which has been transmitted from the UL resource pool "X", in the DL resource pool "Y".

Also, considering processing time of the network, a resource for performing blind detection may be limited even within the DL resource pool "Y". For example, if the UE has performed contention based UL transmission at subframe "n" of UL subframes which belong to the resource pool "X", the UE may perform ACK/NACK blind detection at a subframe which belongs to the resource pool "Y" among subframes subsequent to a subframe "n+k", or in a specific resource region within the corresponding subframe. "k" may be defined previously, or may be configured for the UE through higher layer signaling.

Meanwhile, the subframe which belongs to the resource pool "Y" or the resource region within the subframe may exist in a plural number. In this case, the UE may perform blind detection for a plurality of resource regions which belong to the resource pool "Y" while existing after the subframe "n+k".

Also, the network may repeat ACK/NACK signaling at the subframe which belongs to the resource pool "Y" subsequent to the subframe "n+k" predetermined times. ACK/NACK repetition pattern may previously be defined UE-specifically or cell-commonly. In this case, the UE may enhance the probability of ACK/NACK decoding by performing combining in accordance with a repetition pattern even if ACK/NACK decoding is failed at one subframe.

The unit resource suggested as above may be construed as a reference resource unit of ACK/NACK transmission which will be described below. For example, UL transmission of a specific UE may be performed over a plurality of unit resources. Also, the resource pool suggested as above may be signaled including a time domain resource (e.g., subframe set). Alternatively, the network may configure a plurality of resource pools within the subframe, and may signal a specific subframe set to the UE. Subframes which belong to the signaled subframe set may follow the same resource pool configuration.

<UE-Specific ACK & Resource-Specific NACK Transmission>

As described above, if a receiving side fails in decoding due to collision, etc. in contention based transmission, a problem occurs in that a transmitting side cannot be specified. In contention based transmission, the network may regard that decoding of UL data transmitted by the UE has been failed for two cases as follows. One of the two cases is that a power of UL signal is sufficient but interference is increased due to collision, etc., and the other one of the two cases is that decoding failure occurs due to an insufficient power of UL signal. As a first solution of these cases, collision may be avoided or a coding rate may be lowered. As a second solution, a method for enhancing a power of UL signal may first be used. In the first solution, the method for increasing UL signal power in the UE may be considered but a problem occurs in that UL signal of the increased power acts as strong interference upon UL signal transmitted by another UE. To solve this problem, the following method is suggested.

The network may perform blind detection and decoding for UL transmission performed by the UE within coverage, and may transmit ACK/NACK to the UE. In contention based transmission, a method for broadcasting NACK and transmitting ACK through UE-specific signaling since it is difficult to determine a UE which transmits the corresponding message if decoding is failed will be suggested.

(1) ACK Transmission

For UE-specific ACK transmission, the UE may include UE ID in a transport block in contention based transmission. Alternatively, the UE may provide information indicating that a part (e.g., DMRS scrambling parameter) of transmission parameters corresponds to UE ID or UE group ID. For example, UE ID may be included as a part of a higher message. Also, for smooth processing in the network, information indicating whether a corresponding message is new transmission and/or HARQ process number may be included in a message transmitted by contention based UL transmission in the form of a message of a physical layer or a higher layer similarly to NDI of UL grant. As another method for notifying the UE of HARQ process, the network may configure HARQ process number that may be transmitted per resource. For example, a different resource pool may be mapped into each HARQ process. For example, the network may designate a resource pool where UL transmission corresponding to a specific HARQ process number may be performed, and the UE may perform UL transmission corresponding to HARQ process of each resource pool.

If the network successfully performs decoding by receiving contention based transmission, the network may perform ACK transmission to the corresponding UE based on UE ID, NDI and/or HARQ process number included in the corresponding message. At this time, ACK transmission may be performed through a physical channel defined for ACK/NACK transmission, like PHICH, or may be included in DCI transmitted to the corresponding UE.

The UE may attempt ACK reception on the assumption that ACK transmission for UL transmission is performed at DL subframe corresponding to N+K or available DL subframe of DL subframes subsequent to N+K if a subframe index for which contention based UL transmission has been performed is N. In this case, K may be determined considering propagation delay of UL/DL transmission and reception and processing time of the receiving side.

In the NR, ACK transmission timing may be determined considering Tx/Rx analog beamforming. For example, the network may previously transmit a subframe set for which transmission and reception are performed for each analog beam or analog beam list used per subframe, within coverage through UE dedicated signaling or a broadcast signal. The UE may perform a reception operation on the assumption that ACK transmission is performed at a preferred subframe which is the fastest subsequent to (N+K) subframe. The preferred subframe may be a subframe previously reported by the UE, or may be a subframe transmitted and received by a beam allocated from the network to the corresponding UE.

Also, information on contention based UL transmission associated with the corresponding ACK signal may be included in the ACK message suggested as above. For example, the ACK signal may include HARQ process number of contention based UL transmission associated therewith. Additionally, the ACK signal may include information (e.g., TB index and HARQ process number) on transport block which is not received by the network.

If ACK signal is not received at the ACK reception timing suggested as above or within a certain time window from the ACK reception timing, the UE may recognize corresponding UL transmission as NACK and perform retransmission.

(2) NACK Transmission

The network attempts decoding per unit resource in a resource pool of contention based transmission. If decoding/detection is failed and/or a transmission UE in a corresponding resource cannot be specified, the network may transmit NACK signal per unit resource in the form of bitmap. For example, if the number of unit resources for a specific resource pool is 10, the network may notify NACK through a bitmap of 10 bits. At this time, the bitmap may be transmitted by being included in a new DCI format, or may be transmitted through a resource of a data region indicated by DCI. Also, since the corresponding bitmap is not transmitted by targeting a specific UE, the network may notify the UEs that corresponding DCI broadcasts NACK information, by masking newly defined RNTI (e.g., NACK-RNTI) in the corresponding DCI. Also, to indicate that corresponding NACK information is for a specific resource pool, the network may define new RNTI per contention based UL transmission resource pool or define RNTI that includes a resource pool index, or may include a resource pool indicator in the corresponding DCI. Alternatively, NACK information may previously be defined to be transmitted from time/frequency resources associated with each resource pool.

As described above, one of decoding failure causes for contention based UL transmission in the network is that a signal power of the corresponding UE is sufficient but decoding is failed due to interference. In one embodiment of the present invention, this case is defined as NACK (e.g., bitmap is set to '1'). If the UE fails to receive ACK signal and receives NACK for a resource used for its transmission, the UE may perform retransmission. At this time, the UE may apply a method for handling interference to retransmission.

For example, the UE may apply a coding rate lower than that of previous transmission to retransmission or perform retransmission by increasing used resources. Alternatively, as suggested above, the network may configure a resource pool for retransmission to be greater than that of initial transmission, thereby lowering the probability of collision, or may signal or previously define such that resources are transmitted a low coding rate in a resource pool for retransmission. However, the UE may use a transmission power equally to that of previous transmission on the assumption that a signal power is not lack if NACK signal is received. Use of a transmission power the same as that of previous transmission may be intended to prevent interference on another UE from being increased due to increase of the transmission power.

Meanwhile, since ACK is delivered through UE-specific signaling, a different meaning may be given to each of NACK bit values 0 and 1. For example, in the NACK bitmap, '0' may mean decoding failure due to a lack of a signal power. If the network performs energy detection for a specific unit resource and energy does not exceed a specific threshold value, NACK bit for the corresponding unit resource may be set to '0'. Also, if energy detected from the unit resource exceeds a threshold value and decoding in the unit resource is performed successfully, the network may transmit ACK signal to the UE which has transmitted the corresponding signal. If interference measured during decoding of the corresponding signal does not exceed a threshold value, a bit for the corresponding resource in the NACK bitmap may be set to '0'. If the measured interference exceeds a threshold value, the network may set NACK bit for the corresponding resource to '1'.

As another method for transmitting NACK signal, an on-off keying method may be considered. For example, if decoding of ACK/NACK signaling transmitted in the form of DCI is failed, the on-off keying method may be considered as a method for solving the problem that there is no information that can be acquired by the UE. The UE may determine NACK by using energy detection, etc. The NACK bit "0" case suggested as above may be replaced with DTX or the case that energy of a specific level or less is detected or not as a result of energy detection. For example, if the UE has not received ACK and energy of a specific level or less has been detected as a result of energy detection from DL resources, the UE may determine that its UL transmission has been failed due to interference.

Meanwhile, if ACK is received and NACK bitmap for a corresponding resource pool is received, the UE which has performed contention based UL transmission may disregard the NACK bitmap. Also, if a bit for the unit resource used by the UE is '0', which corresponds to the case that the UE fails to receive ACK and receives NACK bitmap, a transmission power may be increased in retransmission. For example, the UE may perform retransmission by increasing a transmission power as much as a step size previously defined or signaled by the network. At this time, since retransmission is not caused by decoding failure, retransmission may be performed in a resource pool for initial transmission. On the other hand, if the UE fails to receive ACK and NAC bit for transport resources is '1', interference may be handled using the method for lowering a coding rate or increasing transport resources. For example, a size greater than that of a resource pool for initial transmission may be applied to the resource pool for retransmission to lower the probability of collision.

If the NACK transmission scheme suggested as above is used, the UE may identify UL transmission failure due to collision or decoding failure, and the network may change the resource pool more flexibly. For example, if decoding failure for UL transmission at a specific timing is caused by a low power, the UE may boost a power while performing retransmission in the same resource pool as that of initial transmission, and a base station which has recognized this case may use a resource pool designated for retransmission by changing the resource pool to another purpose of use. For example, the base station may change the purpose of use of the resource pool designated for retransmission and allocate the changed resource pool to UEs which perform grant-based transmission. This change of the purpose of use in the resource pool may be useful to reduce overhead generated as the resource pool that occupies a relatively great size is designated.

Figure 8:
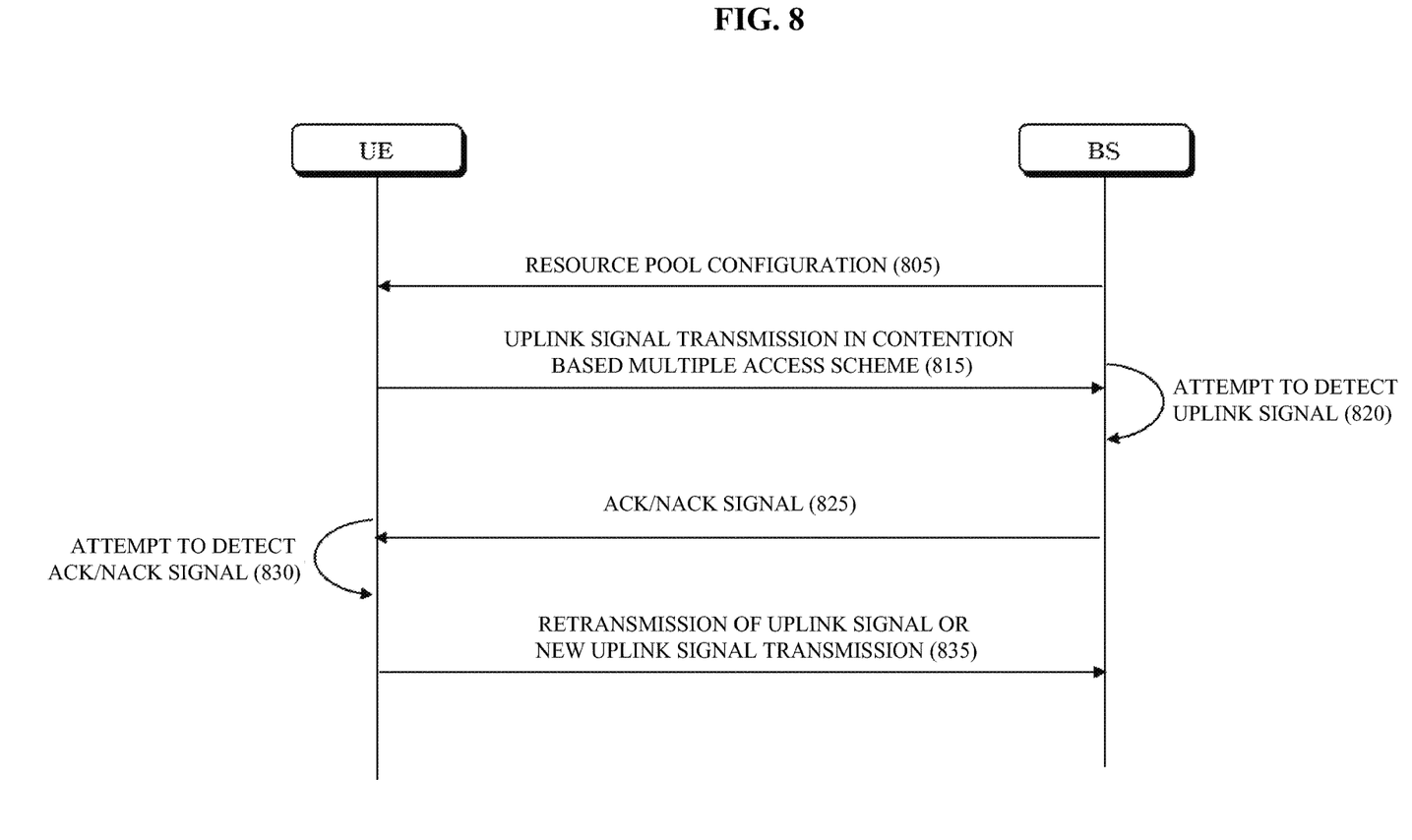
FIG. 8 is a diagram illustrating a method for transmitting or receiving ACK/NACK signal in accordance with one embodiment of the present invention.

FIG. 8 is a diagram illustrating a flow of a method for transmitting or receiving ACK/NACK signal in accordance with one embodiment of the present invention. Repeated description of the aforementioned description will be omitted.

Referring to FIG. 8, the UE receives a resource pool configuration from the base station (805). For example, the UE may receive information on each of a first resource pool for initial transmission of an uplink signal and a third resource pool for retransmission of an uplink signal from the base station. The UE may receive information on a second resource pool associated with the first resource pool to receive ACK/NACK signal.

The UE transmits an uplink signal in a contention based multiple access scheme (815). For example, the UE transmits an uplink signal, which includes a UE identifier, in a contention based multiple access scheme through one of a plurality of resources which belong to the first resource pool.

The base station attempts to detect the uplink signal (820).

The base station transmits at least one of ACK signal and NACK signal for the uplink signal on the second resource pool associated with the first resource pool (825). The ACK signal may be signaled UE-specifically based on the UE identifier. The NACK signal may be broadcasted through a bitmap specific to the first resource pool. The bitmap may include a plurality of bits each corresponding to the plurality of resources which belong to the first resource pool. If detection of the uplink signal is failed, the base station may set a bit value corresponding to a resource used for UL transmission among the plurality of bits included in the bitmap in accordance with a failure cause of uplink signal detection. For example, if detection of the uplink signal is determined to have been failed due to a lack of a transmission power, the base station may set the corresponding bit value to a first value, and if detection of the uplink signal is determined to have been failed due to interference from another UE, the base station may set the corresponding bit value to a second value.

The UE attempts to detect at least one of ACK signal and NACK signal for the uplink from the second resource pool associated with the first resource pool (830). Afterwards, the UE performs retransmission of the uplink signal based on the ACK signal or the NACK signal or transmits a new uplink signal (835).

The UE may assume that the ACK signal is UE-specifically signaled based on the UE identifier and the NACK signal is broadcasted through a bitmap specific to the first resource pool.

The UE may determine a failure cause of UL signal transmission in accordance with a bit value corresponding to a resource used for UL signal transmission among a plurality of bits included in the NACK bitmap. For example, if the corresponding bit value is a first value, the UE may regard that initial transmission of the uplink signal has been failed due to a lack of a transmission power and retransmit the uplink signal by boosting the transmission power. Unlike this case, if the corresponding bit value is a second value, the UE may regard that initial transmission of the uplink signal has been failed due to interference from another UE and retransmit the uplink signal at a coding rate lower than that of initial transmission or retransmit the uplink signal through the third resource pool having a unit resource greater than that of the first resource pool.

If the ACK signal is detected, the UE may disregard the NACK signal even though the NACK signal is detected. The UE may perform UL retransmission if the ACK signal is not detected and the NACK signal is detected.

Figure 9:
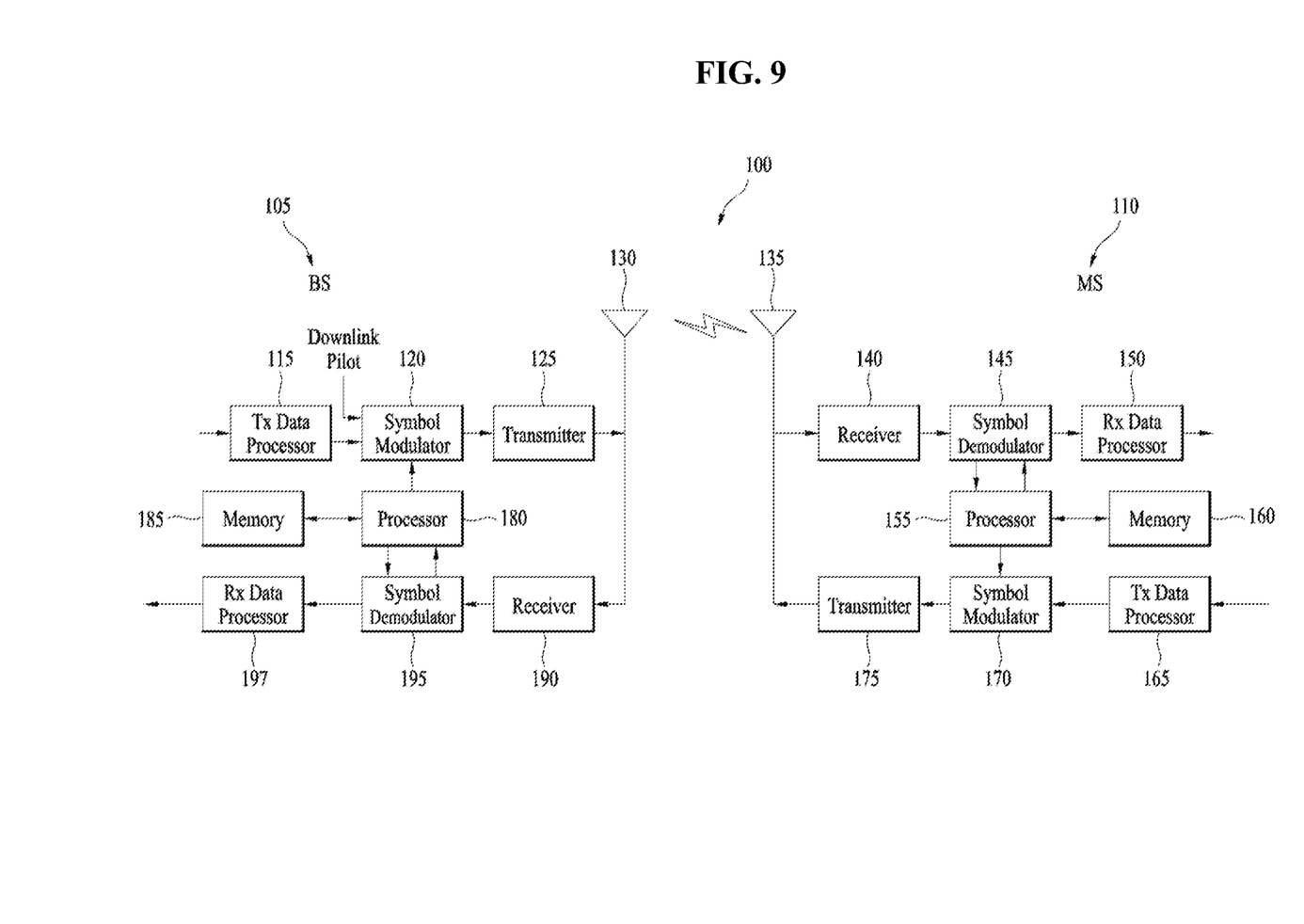
FIG. 9 is a diagram illustrating a UE and an eNB according to one embodiment of the present invention.

FIG. 14 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

A base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention mentioned in the foregoing description are applicable to various kinds of mobile communication systems.

The invention claimed is:

1. A method of receiving an acknowledgement (ACK)/non-acknowledgement (NACK) signal by a user equipment (UE) in a wireless communication system, the method comprising:
    transmitting an uplink signal including a UE identifier of the UE on a resource belonging to a first resource pool based on a contention-based multiple access scheme; and
    attempting to detect an ACK signal and a NACK signal for the uplink signal from a second resource pool related to the first resource pool,
    wherein in attempting to detect the ACK signal and the NACK signal, the UE assumes that the ACK signal is UE-specifically signaled based on the UE identifier, and the NACK signal is broadcasted through a bitmap,
    wherein the bitmap includes a plurality of bits, each of the plurality of bits being related to each of a plurality of resources belonging to the first resource pool, and
    wherein the UE determines a failure cause in transmission of the uplink signal based on a bit value related to the resource for transmission of the uplink signal.

2. The method of claim 1, wherein, based on the bit value being a first value, the UE regards that initial transmission of the uplink signal has been failed due to a lack of a transmission power, and retransmits the uplink signal by boosting the transmission power.

3. The method of claim 1, wherein, based on the bit value being a second value, the UE regards that initial transmission of the uplink signal has been failed due to interference from another UE, and retransmits the uplink signal at a coding rate lower than that of the initial transmission or retransmits the uplink signal through a third resource pool having a unit resource greater than that of the first resource pool.

4. The method of claim 1,
    wherein the UE disregards the NACK signal based on the ACK signal being detected, even though the NACK signal is detected if the ACK signal is detected, and
    wherein the UE performs uplink retransmission based on the ACK signal being not detected and the NACK signal being detected.

5. The method of claim 1, further comprising:
    receiving, from a base station, information regarding each of the first resource pool for initial transmission of the uplink signal and the third resource pool for retransmission of the uplink signal.

6. A user equipment (UE) for receiving an acknowledgement (ACK)/non-acknowledgement (NACK) signal in a wireless communication system, the UE comprising:
    a transmitter to transmit an uplink signal including a UE identifier of the UE on a resource belonging to a first resource pool based on a contention-based multiple access scheme; and
    a processor to attempt to detect an ACK signal and a NACK signal for the uplink signal from a second resource pool related to the first resource pool,
    wherein in attempting to detect the ACK signal and the NACK signal, the processor assumes that the ACK signal is UE-specifically signaled based on the UE identifier, and the NACK signal is broadcasted through a bitmap,
    wherein the bitmap includes a plurality of bits, each of the plurality of bits being related to each of a plurality of resources belonging to the first resource pool, and
    wherein the UE determines a failure cause in transmission of the uplink signal based on a bit value related to the resource for transmission of the uplink signal.

7. A method of transmitting an acknowledgement (ACK)/non-acknowledgement (NACK) signal by a base station in a wireless communication system, the method comprising:
    attempting to detect an uplink signal including a user equipment (UE) identifier on a resource belonging to a first resource pool,
    wherein the uplink signal is transmitted based on a contention-based multiple access scheme; and
    transmitting an ACK signal and a NACK signal for the uplink signal on a second resource pool related to the first resource pool,
    wherein in transmitting the ACK signal and the NACK signal, the base station UE-specifically signals the ACK signal based on the UE identifier, and broadcasts the NACK signal through a bitmap,
    wherein the bitmap includes a plurality of bits, each of the plurality of bits being related to each of a plurality of resources belonging to the first resource pool, and
    wherein the UE determines a failure cause in transmission of the uplink signal based on a bit value related to the resource for transmission of the uplink signal.

8. The method of claim 7, wherein, based on detection of the uplink signal being failed due to a lack of a transmission power, the base station sets the bit value to a first value, and based on detection of the uplink signal being failed due to interference from another UE, the base station sets the bit value to a second value.

9. The method of claim 7, further comprising:
    receiving the uplink signal retransmitted from the UE after the NACK signal is transmitted,
    wherein the retransmitted uplink signal has a coding rate lower than that of initial transmission or is received through a third resource pool having a unit resource greater than that of the first resource pool.

10. The method of claim 9, further comprising:
    transmitting information regarding each of the first resource pool for initial transmission of the uplink signal and the third resource pool for retransmission of the uplink signal.

11. A base station for transmitting an acknowledgement (ACK)/non-acknowledgement (NACK) signal in a wireless communication system, the base station comprising:
    a processor to attempt to detect an uplink signal including a user equipment (UE) identifier on a resource belonging to a first resource pool,
    wherein the uplink signal is transmitted based on a contention-based multiple access scheme; and
    a transmitter to transmit an ACK signal and a NACK signal for the uplink signal from a second resource pool related to the first resource pool under control of the processor,
    wherein in transmitting the ACK signal and the NACK signal, the processor UE-specifically signals the ACK signal based on the UE identifier, and broadcasts the NACK signal through a bitmap,
    wherein the bitmap includes a plurality of bits, each of the plurality of bits being related to each of a plurality of resources belonging to the first resource pool, and
    wherein the UE determines a failure cause in transmission of the uplink signal based on a bit value related to the resource for transmission of the uplink signal.

* * * * *